May 26, 1959
T. F. TRIBE
2,888,510
FLUID COOLED TERMINALS
Filed Feb. 20, 1956
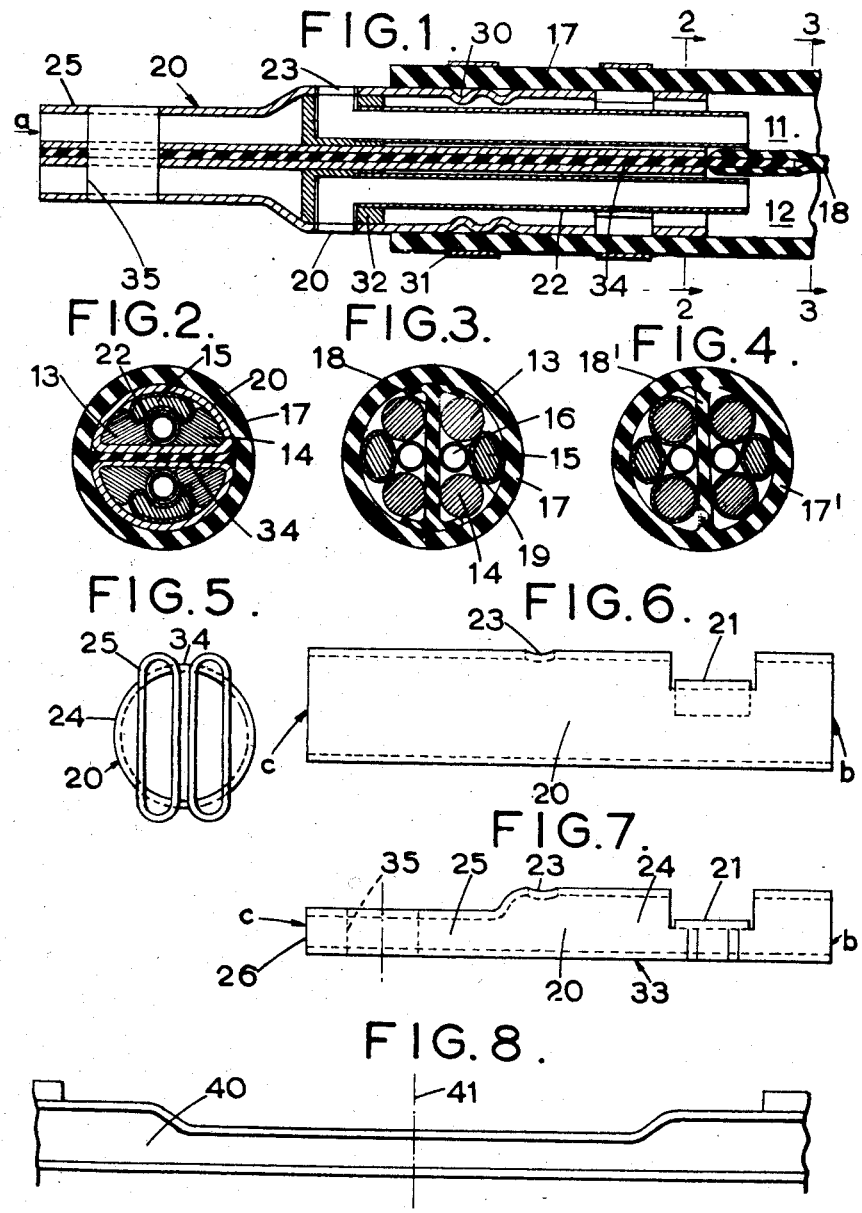
INVENTOR:
THOMAS FRANCIS TRIBE
BY
Richardson, David and Nordon
ATTORNEYS.

United States Patent Office 2,888,510
Patented May 26, 1959

2,888,510

FLUID COOLED TERMINALS

Thomas F. Tribe, Oxford, England, assignor to British Federal Welder and Machine Company Limited, Worcester, England, a British company Application February 20, 1956, Serial No. 566,683

Claims priority, application Great Britain August 31, 1955

2 Claims. (Cl. 174—15)

This invention relates to welding cables and concerns particularly a method of and means for the attachment of a cable to a terminal head or connector for connection to a transformer or to a welding machine. The invention also relates to the production of twin cables, as a unitary structure, for use with welding machines, in which a pair of leads are so interconnected that, on the flow of current therethrough, any movement between the leads caused by the forces of mutual induction is substantially eliminated with the consequence that not only do such cables have a longer working life but they enable the power factor of the machine to be increased with the consequent saving in power. Cables of this kind are usually known as kickless cables.

The object of the invention is to provide an improved terminal head for a welding cable which can be produced very cheaply and very readily and in which the cable is securely held in the head and in good electrical contact therewith. It is a further object of the invention to provide a simple and economical method of producing a pair of kickless welding cables which have a much longer working life than welding cables at present in use.

According to the present invention, the end of a cable is inserted in a copper tube which is then deformed as, for example, in a power press, to have over a portion of its length a substantially semi-cylindrical form in which portion the cable is secured in intimate contact therewith and simultaneously to have over the remaining portion of its length a flat terminal or connector portion with rounded sides and a common continuous flat surface.

Preferably a multi-strand cable is secured in the terminal head of this invention.

If desired, a length of small diameter tubing may be placed in the copper tube to be clamped therein and to serve as a conduit for a coolant.

In some cases a cable may be passed right through a double-length tube to project a predetermined distance on each side thereof, which tube is then deformed symmetrically about a centre line and parted along said centre line to provide in one press operation two headed cables.

After the formation of each head, the terminal portion is drilled to take a clamping bolt and is further drilled through the semi-cylindrical surface to give access to the coolant tube.

A kickless welding cable according to the invention is produced as a unit by providing two three-core multi-strand or bunched cables in a common flexible insulating sheath, e.g. of natural or synthetic rubber, divided diametrically along its length by an insulating web, the cores of each cable running straight through or being twisted along their lengths and secured at each end to a connector as already described, and the two cables and the insulating web also running straight through or being twisted together along their lengths within the insulating sheath, the flat surfaces of the semi-cylindrical connectors being placed together with an insulating board or the like between them, i.e. the cable connectors are secured together back-to-back to provide a unitary kickless cable. A flexible metal coolant carrying tube is embedded in each cable, whilst in order to prevent abrasion of the outer strands of the three cores, a perforated synthetic rubber or polyvinyl sheath may be placed over the length of one or more cores of each cable.

The multi-strand cables may each consist for example of three cores each consisting of a plurality of twisted strands. The number of cores employed of course, will depend upon the load demand on the cable when in use.

As the cable may very well be called upon to suffer considerable movement with respect to the head, it has been found desirable slightly to flare the end of the copper tube and to retain the flare in the formed head to prevent the cable coming into contact with a sharp edge on said tube.

The coolant tube secured in the copper tube is preferably of nickel or the like to minimise electrolytic reaction between the tube and the copper.

The invention is illustrated in the accompanying drawings of which

Figure 1 is a longitudinal section through a kickless welding cable.

Figures 2 and 3 are sections on the lines 2—2 and 3—3 of Figure 1 respectively.

Figure 4 is a view similar to Figure 3 of a slight modification.

Figure 5 is an end view looking in the direction of the arrow *a*.

Figure 6 is a side view of the copper tube to form the end connector, before deformation.

Figure 7 is a side view of the tube after deformation in a press, and

Figure 8 is a view similar to Figure 1 showing two cables joined to a common connector later to be parted.

Each of the welding cables 11 and 12 consists of three cores 13, 14 and 15 enclosed, together with a flexible coolant carrying tube 16, in an outer flexible insulating (rubber) sheath. The two cables and the coolant tubes are separated and insulated from each other by a separate diametrical insulating web 18.

Each cable 11 and 12 is placed from the end *b*, in a copper tube 20 with the one core 15 which, as shown, is sheathed in a perforated rubber or like sheath 19 to prevent abrasion of the strands of the cores, terminating at the depression 21 in the tube 20, whilst the other cores 13 and 14 continue through to the end *c* of the tube. If desired, to improve the electrical conductivity between the cores and the connector the cores may be additionally soldered in the head. A coolant tube 22 is inserted between the cores to extend up to holes 23 drilled in the tube and tapped to take a coolant pipe connector (not shown). The tube 20 is then deformed in a power press until it takes up the conformation shown in Figures 5 and 7 of the drawings, with a portion 24 of semi-cylindrical cross section and a portion 25 flat to serve at the actual connector. The face 33 of each connector is flat along the length of the tube. The end face 26 is tinned after deformation to prevent the ingress of water.

The tube 20 is formed with grooves 30 in alignment with an exterior clip 31 by means of which the flexible sheath 17 is secured to the connectors. The coolant tubes 22 are spaced in the copper tube 20 by spacers 32 and are secured to the flexible tube 16.

In Figure 4 the sheath 17' is shown as formed integrally with the dividing web 18' other wise the arrangement is the same as in Figure 3.

The pair of connectors consisting of the two deformed tubes 20 are arranged back-to-back as shown clearly in Figure 5 and are separated by an insulating board 34 extending right through the connector and engaging the insulating web 18. The connectors are drilled as at 35 whereby connection may be made between the cable and the terminals of a transformer or a welding gun.

In Figure 8 a common connector tube 40 is shown for two cables, which tube after deformation symmetrically about a centre line 41 is parted at that line to provide in one press operation two cable ends.

It will be clear that, by means of this invention there is provided an improved welding cable terminal head or connector of very simple form, which can be attached to the cable with excellent electrical contact, in the actual forming operation of the head, and in which no soldering of the cable to the head is required. Furthermore there is provided a simple, reliable and durable kickless twin cable for use with welding machines.

I claim:

1. The method of forming a unitary terminal block for the conductors of kickless welding cables having a plurality of conductors comprising the steps of inserting the end of a conductor into each end of a tube, respectively, pressing the tube around each conductor so as to clamp the same in conductive relation therein, pressing the tube for a portion of its length midway between said clamped portions to deform same with respect to said clamped portions to form terminal portions, forming a plane surface along the entire length of the tube, severing said tube along a line midway of its length, placing said tubes in back to back relation, inserting an insulating member between said plane surfaces and enclosing said tubes in an insulating sheath.

2. The method of forming a unitary terminal block for the conductors of kickless cables as set forth in claim 1, including the step of positioning a conduit adjacent each of said conductors to provide means for conveying a cooling medium to cool said cables.

References Cited in the file of this patent

UNITED STATES PATENTS

| | | |
|---|---|---|
| 1,267,832 | Wilkinson | May 28, 1918 |
| 1,674,829 | La Bean | June 26, 1928 |
| 1,938,702 | Kachel | Dec. 12, 1933 |
| 2,691,691 | Wreford | Oct. 12, 1954 |